(12) United States Patent
Irish

(10) Patent No.: US 6,554,660 B2
(45) Date of Patent: Apr. 29, 2003

(54) PROPULSION SYSTEM FOR YACHTS, TRAWLERS AND THE LIKE

(76) Inventor: John T. Irish, 121 E. Ohio St., Indianapolis, IN (US) 46204

( * ) Notice: Subject to any disclaimer, the term of this patent is extended or adjusted under 35 U.S.C. 154(b) by 0 days.

(21) Appl. No.: 09/962,378

(22) Filed: Sep. 25, 2001

(65) Prior Publication Data

US 2002/0037675 A1 Mar. 28, 2002

Related U.S. Application Data

(60) Provisional application No. 60/236,071, filed on Sep. 28, 2000.

(51) Int. Cl.[7] ............................................. B63H 11/00
(52) U.S. Cl. ...................................................... 440/38
(58) Field of Search ............................ 440/38, 39, 40, 440/41, 42, 43; 114/144 R, 151

(56) References Cited

U.S. PATENT DOCUMENTS

| | | | | | |
|---|---|---|---|---|---|
| 2,730,065 | A | * | 1/1956 | Piper | 440/38 |
| 3,155,065 | A | * | 11/1964 | Strumskis | 440/38 |
| 4,461,620 | A | | 7/1984 | Brachet | 440/38 |
| 4,605,376 | A | | 8/1986 | Aschauer | 440/38 |
| 4,767,364 | A | | 8/1988 | Lenz | 440/38 |
| 4,863,404 | A | | 9/1989 | Salo | 440/38 |
| 5,045,002 | A | | 9/1991 | Torneman et al. | 440/38 |
| 5,123,867 | A | | 6/1992 | Broinowski | 440/42 |
| 5,205,765 | A | | 4/1993 | Holden | 440/66 |
| 5,401,195 | A | * | 3/1995 | Yocom | 440/38 |
| 6,273,769 | B1 | * | 8/2001 | Bell | 440/38 |

* cited by examiner

*Primary Examiner*—Stephen Avila
(74) *Attorney, Agent, or Firm*—Woodard, Emhardt, Naughton, Moriarty & McNett LLP

(57) ABSTRACT

The present invention provides a propulsion system mounted in the hull of a marine vessel. The system includes a conduit system with water intake openings defined in the port and starboard portions of the hull adjacent the bow. Water intake conduits conduct water from the water intake openings to a collection chamber. Water discharge conduits conduct water from the collection chamber to water discharge openings. At least one impeller is mounted in each of said discharge conduits. A valve system is mounted in the conduit system and is selectively operable to isolate the system and prevent the flow of water through the system. A water pump may be used to evacuate water from the system when the valves are closed. A further preferred feature provides access to the impeller portion of the propulsion system. A conduit extension section diverges from the conduit system with one end above the level of the vessel's waterline. A sealable hatch is mounted to the conduit extension.

18 Claims, 4 Drawing Sheets

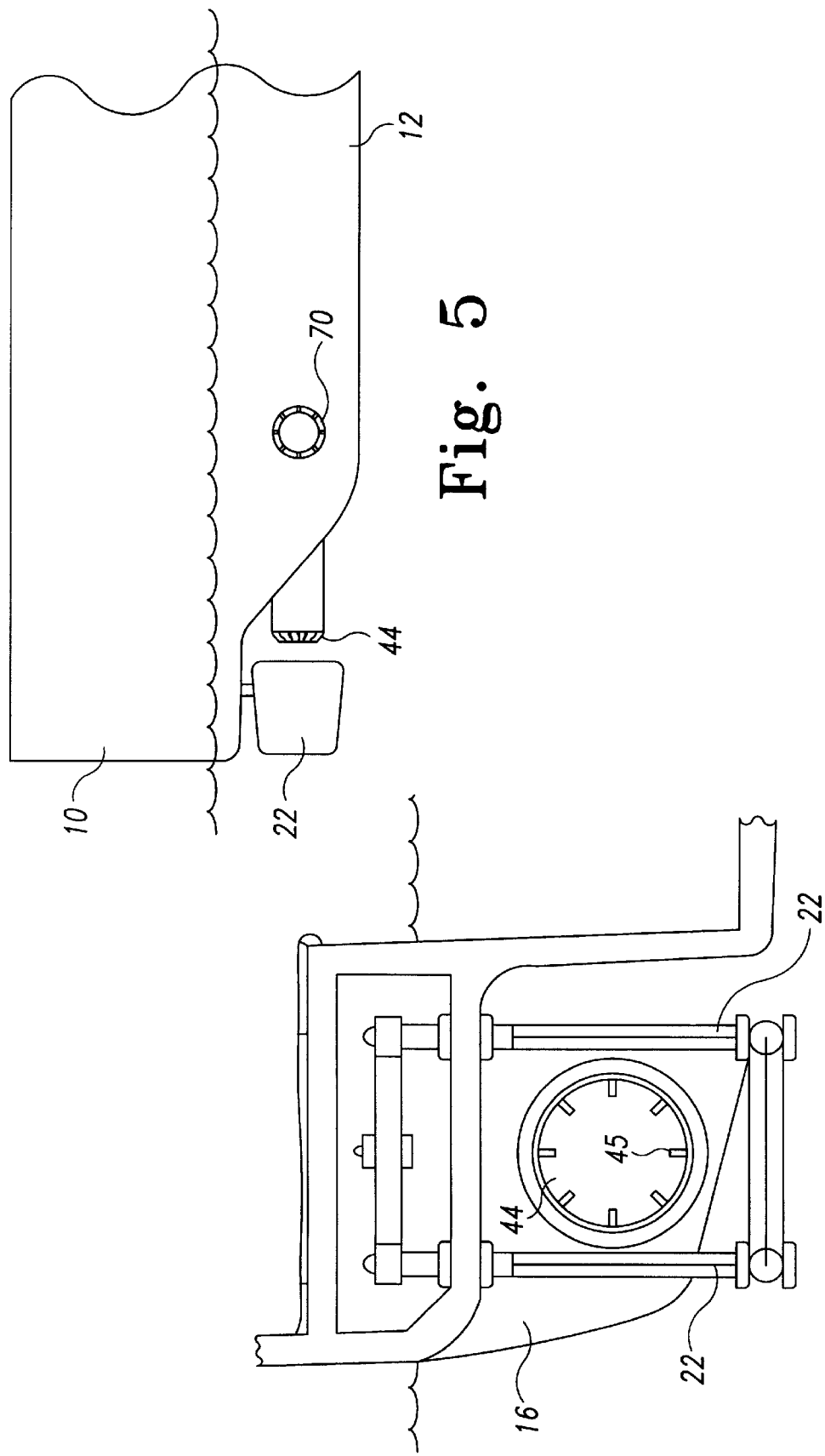

PROPULSION SYSTEM FOR YACHTS, TRAWLERS AND THE LIKE

RELATED APPLICATION

This application claims priority to provisional application Ser. No. 60/236,071, filed Sep. 28, 2000. The provisional application is hereby incorporated by reference.

FIELD OF THE INVENTION

Preferred embodiments of the present invention deal with propulsion systems, and more particularly with an improved impeller or water jet system and method for propelling marine vessels such as yachts, trawlers and the like.

BACKGROUND OF THE INVENTION

Marine vessels, such as yachts, trawlers, ships and boats, are known to use various propulsion systems. A conventional propulsion system includes a propeller or "prop" mounted underneath and/or behind the hull of the vessel on a driveshaft extending from an engine compartment. When the propeller is driven to provide thrust, the vessel is pushed forward; however, such systems suffer in efficiency since a propeller pushes some water in directions other than the preferred direction of thrust. Moreover, the extended propeller and drive shaft can impact objects or the ground, can be fouled in seaweed, lines or other debris, can develop marine growths or can impact other items such as sea creatures, potentially damaging the propeller or the object encountered. This can be particularly dangerous in yachts or similar sized boats where people may be swimming or diving near the vessel.

One alternative to a conventional propeller is an impeller propulsion system also known as a water jet system. An impeller system pulls water through a water intake opening (typically located underneath and towards the middle to stern of the vessel) and then forces it through a channel and out through a discharge opening to propel the vessel. An impeller system typically includes a propeller or pumping mechanism mounted within the channel which is used to accelerate and focus the water movement. The expelled water force or jet pressure pushes the vessel forward. Conventional impeller systems frequently suffer from high maintenance needs, turbulence and cavitation within the channel, and frequently require a larger engine capacity and/or an engine operating at higher rpm.

Further, in waves or chop, the vessel may move so that the water intake opening(s) are exposed to air, introducing air bubbles into the system, causing a sudden reduction in resistance. Excess air can result in a momentary release of the propeller, i.e. cavitation, allowing the engine to rev too quickly and potentially damaging the engine. Accordingly, there is a need for an improved propulsion system.

In conventional and impeller systems, the propeller and shaft are normally exposed to the ambient water whenever the vessel is afloat. This exposes the metal and equipment to rust, debris and marine growth resulting in increased maintenance costs, especially in salt water. Due to the mounting of the propeller and shaft under the hull or within a channel, maintenance and/or replacement is difficult. Moreover, in many such vessels, the propulsion equipment is not in use a large percentage of the time. Accordingly, it is also desirable to provide a propulsion system where exposure to ambient water is minimized and maintenance and service can be facilitated.

The present invention addresses these needs.

SUMMARY OF THE INVENTION

A preferred embodiment of the present invention provides a propulsion system mounted in the hull of a marine vessel. The system includes a conduit system with water intake openings defined in the port and starboard portions of the hull adjacent the bow and below the waterline of the vessel. A third water intake may be defined amidship in the vessel's keel. A collection or mixing chamber is mounted within the hull. Water intake conduits conduct water from the water intake openings to the collection chamber. Water discharge openings are symmetrically defined in the stern of the hull. Water discharge conduits conduct water from the collection chamber to the water discharge openings. At least one impeller is mounted in each of the discharge conduits.

In an alternate preferred embodiment, the present invention provides a system for isolating an impeller propulsion system mounted within the hull of a marine vessel. At least one water intake opening is defined in the hull of the marine vessel. At least one water discharge opening is defined in the stern of the hull of the marine vessel. A conduit system extends from the water intake opening(s) to the water discharge opening(s). At least one water intake valve is selectively operable to prevent the flow of water through the water intake opening(s), and at least one water discharge valve is selectively operable to prevent the flow of water through the water discharge opening(s). The system may further include a pump connected to the conduit system, and operable to evacuate water from the system when the water intake and the water discharge valves are closed.

A further preferred embodiment of the present invention provides a feature allowing access to the impeller portion of a propulsion system mounted within a marine vessel. The impeller portion of the propulsion system is normally mounted in a conduit within the hull below the waterline. A conduit extension or access tube section diverges from the conduit with a first end in open communication with the conduit adjacent the impeller. The opposing end of the conduit extension extends above the level of the vessel's waterline. A sealable hatch is mounted to the opposing end of the conduit extension and may be opened to service the impeller.

It is a preferred object of the present invention to provide propulsion system for a marine vessel.

It is a further preferred object of the present invention to provide an improved propulsion system which is safer and more efficient.

It is another preferred object of the present invention to provide an improved propulsion system with reduced and easier maintenance.

It is still another preferred object of the present invention to provide a propulsion system which may be stored in a dry state while the vessel is still in the water.

Further objects, features and advantages of the present invention shall become apparent from the detailed drawings and descriptions provided herein.

BRIEF DESCRIPTION OF THE DRAWINGS

FIG. 4 is a partial rear view of a marine vessel in accordance with a preferred embodiment of the present invention.

FIG. 5 is a partial side view of a marine vessel in accordance with an alternate preferred embodiment of the present invention.

DESCRIPTION OF PREFERRED EMBODIMENTS

Figure 1:
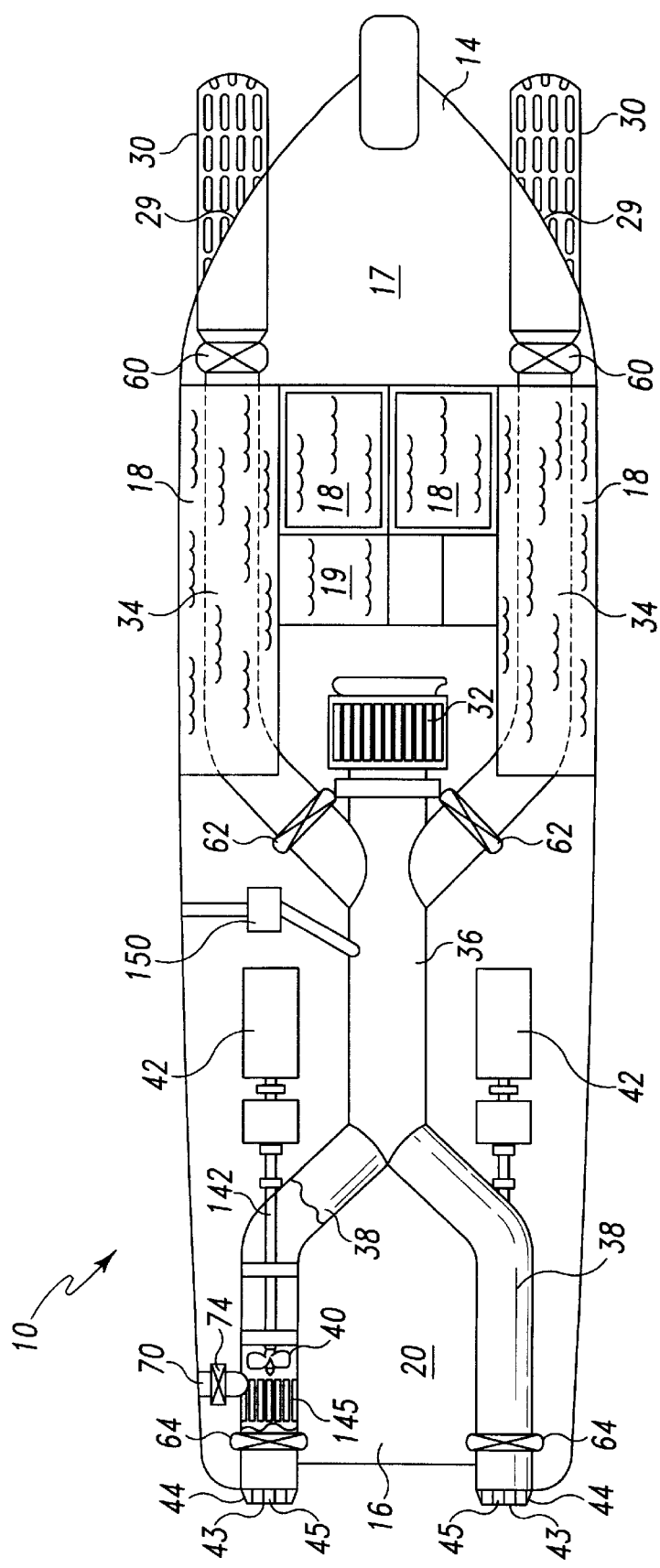
FIG. 1 is a cut-away, top view of a preferred embodiment of a propulsion system in accordance with the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, and alterations and modifications in the illustrated device, and further applications of the principles of the invention as illustrated therein are contemplated as would normally occur to one skilled in the art to which the invention relates.

Referring now to FIGS. 1–5, there are illustrated preferred embodiments of the present invention, namely an impeller propulsion system for a water vessel or water craft. The vessel is schematically represented in the Figures with vessel hull 10. The present invention is designed for large vessels such as yachts, trawlers and ships, but could be sized and used in smaller boats as well. A typical impeller propulsion system is contained within a conduit system extending longitudinally within the hull of the vessel 10. The propulsion system is typically mounted with the water intake, the conduits and the water discharges below the waterline of the vessel. The water intake is frequently located in the keel adjacent the middle or stern sections.

The impeller portion includes a pumping mechanism, such as a propeller or prop 40 located in a conduit and mounted on a driveshaft 142 extending into an engine compartment where it is driven by an engine 42. When in use, the engine 42 drives propeller 40 forward to accelerate and force water through the conduit, expelling the water through a discharge orifice in the stern 16. The discharge force propels the vessel 10 forward. The system can reverse the propeller direction to slow or back the vessel, or a plate or bucket may be used to redirect the flow of water in a reverse or braking direction. Additionally, the propeller can be reversed to backflush the system for maintenance. Notwithstanding the above, forward movement is primarily discussed herein for simplicity.

Figure 2:
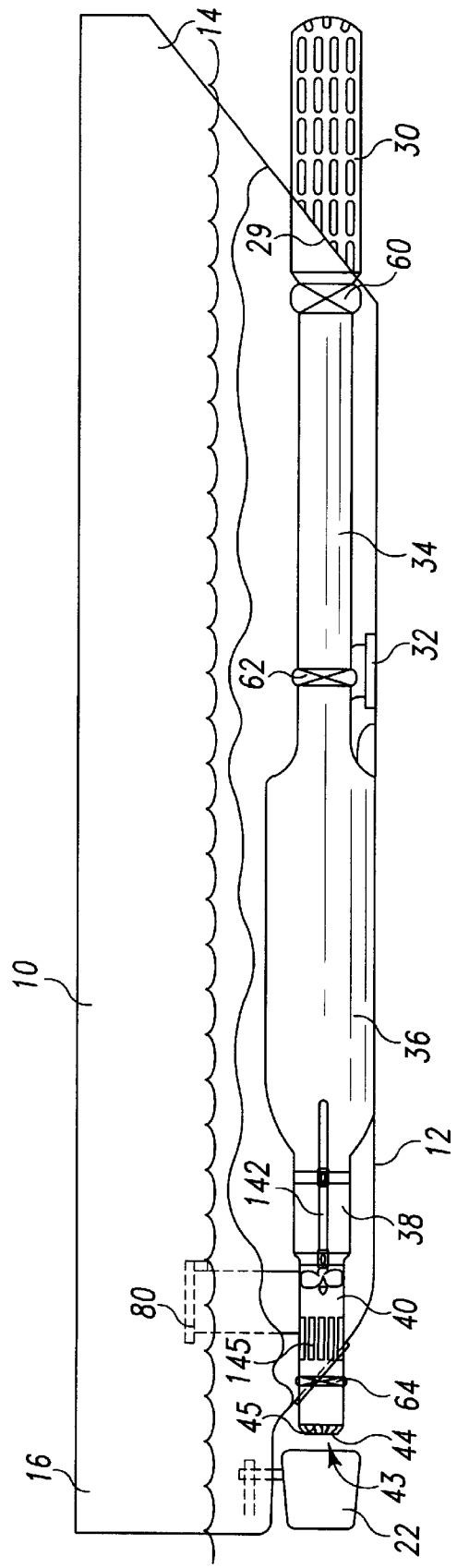
FIG. 2 is a side, cut-away view of the embodiment illustrated in FIG. 1.

FIGS. 1–2 illustrate a specific preferred embodiment of an impeller propulsion system. FIG. 1 is a top-down view of a vessel showing a cross-section generally below the water line of the vessel. FIG. 1 is partially cut-away. FIG. 2 is a cut-away, sideview of the embodiment illustrated in FIG. 1. Water intake openings 29 are defined in hull 10. In the illustrated preferred embodiment, water intake openings 29 are symmetrically defined on the starboard and port sides adjacent to the bow 14 of the hull 10 below the vessel's waterline. A third water intake opening 32 may be mounted amidships in the keel 12 of the hull 10. Water intake cylinders 30 may be mounted over intake openings 29. The surface of water intake cylinders 30 may be grated, slotted, or otherwise configured to allow water into intake openings 29 but to keep oversized debris or solid objects from entering the system. A similar grate or filter is mounted over third water intake opening 32. The system can accommodate some small particles in the water, such as sand or gravel, but preferably screens out larger objects which could potentially damage the system lining or the propeller(s).

A conduit system carries water within hull 10. Water intake openings 29 and 32 are attached to intake or feed conduits or pipes 34 which carry water from the intake openings to collection chamber 36. Collection chamber 36 is preferably a larger conduit or cylindrically shaped chamber. Collection chamber 36 serves as a water collection and storage point. The conduit system extends longitudinally within hull 10, passing through standard areas such as crew compartments 17, fuel tanks 18, water tanks 19 and bulkheads.

Discharge tubes or conduits 38 extend from collection chamber 36 to discharge openings or orifices 43 in the stern 16 of hull 10. Preferably the discharge openings 43 are symmetrically arranged below the water line to provide balanced thrust. For example, the discharge openings 43 may be arranged to either side of a wet/dry garage 20, as discussed in the incorporated provisional application and co-pending application Ser. No. 09/962,767.

Surrounding each discharge opening 43 is a reducing nozzle 44, preferably including a plurality of turbulator tabs 45 mounted around the internal circumference of nozzle 44. Turbulator tabs 45 are preferably planer pieces mounted to the nozzle to straighten the discharged water flow and reduce turbulence and cavitation. Turbulator tabs 45 and nozzle 44 increase flow speed resulting in greater thrust efficiency. A rear view of a discharge opening 43 is illustrated in FIG. 4.

Mounted within each discharge tube 38 is a pumping mechanism such as an impeller prop 40. Prop 40 is rotated by engine 42 via drive shaft 142 to propel water through the discharge tube 38 and expel it from discharge opening 43. The displaced water creates a suction, pulling water from collection chamber 36, and, by extension, draws water into the conduit system through intake openings 29 and 32. In a preferred embodiment of the present invention shown in FIGS. 1–2, the cross-sectional area of water intake cylinders 30 is greater than the cross-sectional area of the intake conduits 34. The water intake openings 29 and intake conduits 34 of the propulsion system are preferably sized to handle or contain up to twice the amount of water that the prop 40 requires at maximum speed. In a preferred embodiment, the cross-sectional size of the conduit system decreases by section from bow to stern. As an exception, collection chamber 36 may have a larger cross-sectional area to assist in its storage function.

For example, an intake cylinder 30 may have a diameter of sixty inches while an intake conduit 34 has a diameter of forty-eight inches. The greater size of the intake cylinders assists in ensuring that sufficient water is fed into the intake conduits, minimizing the introduction of excess air and turbulence. At rest, water initially enters the conduit system to equalize the water level with the vessel's waterline. Once the vessel begins movement, the vessel's own momentum assists in feeding water into the system.

Intake tubes 34 carry water to a large mixing or collection chamber 36, for example with a seventy-two inch cross-section. Collection chamber 36 then feeds water into two forty-eight inch discharge tubes 38. Preferably collection chamber 36 stores and is fed a volume of water greater than the supply drawn by the impellers at maximum speed. This allows for brief variations and interruptions in the incoming water supply without interrupting the water supplied to the impellers. For example, with three intake openings, the vessel can roll or crest a wave where one or more of the intake openings is momentarily clear of the water interrupting the feed, but meanwhile the other openings continue to feed water to collection chamber 36.

By storing excess water capacity, collection or mixing chamber 36 further serves the function of damping turbulence within the water in the chamber. Calmer water allows a more even water feed to discharge tubes 38 and the impellers. In a further preferred embodiment, collection chamber 36 includes an air check-valve to evacuate accumulated excess air from collection chamber 36, but not allowing the passage of liquid.

In one preferred embodiment, tubes 38 include internal straightening vanes 145 to reduce turbulence. The straightening vanes 145 dampen cross-currents and direct water within the conduit in the desired water direction and more evenly around the impeller edges. Straightening vanes 145 may be mounted in conduit 38 in front of and/or behind impeller prop 40.

Figure 3:
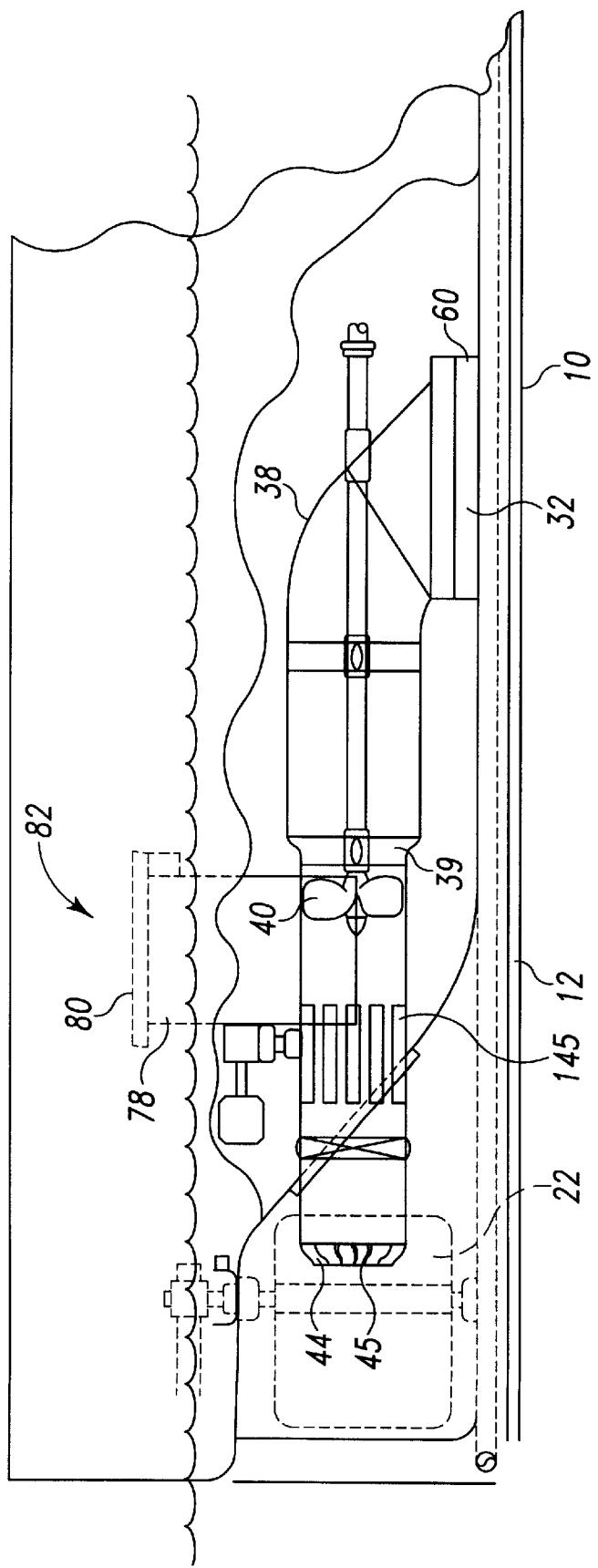
FIG. 3 is a side, cut-away view of an alternate preferred embodiment of the present invention.

In an alternate embodiment, illustrated in FIG. 3, a water intake opening 32 is defined in the middle and rear of keel 12 without forward water intake openings. Feed tube 38 extends from intake opening 32, and is concentrically reduced 39 to become a discharge tube adjacent impeller prop 40. Feed tube 38 can be mounted at an angle, such as forty-five degrees, to assist in feeding water into the opening. Feed tube 38 terminates in a discharge opening 43 and nozzle 44 adjacent to rudders 22.

In one preferred feature, shown as an example in FIG. 3, the diameter of each discharge tube 38 is concentrically reduced or stepped down 39 adjacent to the impeller. Using the Venturi effect, this increases the flow rate and minimizes cavitation. By way of example, feed tube 38 may have an initial diameter of sixty inches and is then concentrically reduced 39 to a diameter of forty-eight inches. At the end of each discharge tube 38, the flow diameter is further reduced by means of a concentric reducer or nozzle 44 with turbulator or straightening tabs 45 installed around the inside circumference of the discharge opening 43.

A further preferred feature illustrated in FIG. 3 is conduit extension or access tube 78, extending from conduit 38 adjacent to prop 40. Conduit extension 79 is connected in communication at one end to conduit 38, and is sealed at the opposing end by removable hatch 80. Preferably, conduit extension 79 has sufficient height to place hatch 80 a distance above the water line of the vessel 10, for example twelve inches. Hatch 80 is of sufficient size and may be opened when necessary to view, service or replace propeller 40. Since it is above the vessel's waterline, hatch 80 may be opened while the propulsion system is filled with water, although preferably not while the system is in use. Alternately, hatch 80 may be opened when the system is stored in a dry state.

Hatch 80 or other portions of the conduit system may optionally include a viewing panel 82 of glass, Plexiglas® sheets or a similar transparent material to allow viewing of the area in the system, such as around the prop. This allows viewing of the waterflow and any debris while the system is closed and/or operating. Also optionally, a light or lights may be mounted within conduit 38 to assist in seeing through panel 82.

The amount of water flowing through water intake openings 29 and 32 may be adjusted with valves depending on the surrounding waves and the speed and roll of the vessel to individually or in combination ensure a smooth and uninterrupted flow of water into chamber 36. These adjustments may be controlled to minimize the introduction of air bubbles which can lead to internal turbulence and cavitation. Preferably the majority of water is introduced through the forward water intakes 29, which also reduces the water resistance as the vessel moves forward.

As a further improved feature of the present invention, the impeller propulsion system includes a valve system. The valve system is operable to isolate the impeller portions of the system, and, when desired, to place the impeller portions or the entire system in a dry state. The valve system includes intake valves 60 closable to prevent water flow through the water intake openings, and discharge valves 64 closable to prevent water flow through the water discharge openings. Other valves, such as middle valves 62, may optionally be used to isolate portions of the propulsion system.

The valves may be of standard types known in the industry and sized to handle large diameter conduits with minimal leakage. Pressure exerted on the valves will be relatively low, at maximum the pressure will correspond to the water pressure at a few feet in depth corresponding to the depth of the hull 10. Examples of appropriate valve types include ball valves, butterfly valves, and knife gate valves. The valve system may further include a pump 150 connected to the propulsion system and operable to evacuate water from the system.

The valve system may be closed when the propulsion system is not in use and/or needs maintenance (for example to service a propeller). While closed, the valve system prevents the entry or exit of water, debris, swimmers or sea creatures within the system, minimizing the potential for damage or injury. When pump 150 is used to evacuate water from the propulsion system, the system may be stored in a dry state even though the vessel remains on the water and the system is below the waterline. Dry storage reduces the immersion of the propulsion system in water, and especially with respect to salt water, reduces the corresponding risk of potential deterioration such as marine deposits, debris or rust. Before each use, the valve system is opened and the water level within the system is allowed to equalize with the surrounding water level.

Further, the conduit systems, valves and pump may be used to regulate the amount of water in the system. Water may be allowed into the system to provide ballast weight, or water may be forced out of the system to provide additional buoyancy to the vessel.

Optionally, port and starboard side thrusters 70 (illustrated in FIGS. 1 and 5) may extend from discharge tubes 38 adjacent the stern of vessel 10 and can be used to assist in steering. Side thrusters 70 may be opened and closed with side valves 74.

The advantages of the present impeller propulsion system versus a conventional prop/strut include:

1. There are no moving parts exposed to the outside elements below the water line. The entire system is in the confines of the vessel.

2. Environmentally friendly by preventing prop impact with objects, animals and land.

3. Grounding of vessel cannot affect the running gear.

4. The props or propellers can be changed from inside of the vessel through the access hatch provided.

5. Where valves are provided, the entire system can be evacuated of seawater. During the time a vessel is at dock or not in use (which can be as much as 90% of its life), the propulsion system can be kept in a dry state.

6. When the intakes are routed to the front of the vessel, the amount of force it takes for the vessel to push through the seas is greatly reduced. This effect also increases the velocity of the intake water to the prop.

7. The midship opening 32 is preferably only used when rough seas are making the bow come out of the water. This feature helps stop prop cavitation.

8. The front inlet tubes can be closed off during rough sea conditions and either pumped out creating high buoyancy or left full creating heavy ballast or any condition in between.

9. With the tube lighting system and viewing ports, the performance of the propellers can be observed from the engine room viewing ports or on screen in color in the pilothouse.

10. State-of-the-art control devices can be installed on the tube system that can give exact G.P.M. flow rates and information that is unknown and only assumed on conventional underwater prop systems.

11. Rear side thrusters can also be driven through control valves at right angles off the main tube system.

The performance and features of the above propulsion system gives the boat owner a level of safety, ease of maintenance, flexibility of operation, and above all the most efficient, powerful system to date not to mention being environmentally friendly.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A propulsion system mounted in a hull of a marine vessel, wherein the marine vessel defines a waterline in relation to the surrounding water, comprising:
    a) at least two water intake openings defined in the hull below the waterline of the vessel;
    b) a collection chamber mounted within the hull;
    c) at least two water intake conduits extending from said water intake openings to said collection chamber;
    d) at least two water discharge openings defined in the stem of the hull;
    e) at least two water discharge conduits extending from said collection chamber to said water discharge openings;
    f) at least one impeller mounted in each of said discharge conduits;
    g) wherein said at least two water intake openings are adjacent the bow on the port and starboard portions of the hull; and,
    h) at least a third water intake opening defined in the keel of the hull and coupled to said collection chamber.

2. The propulsion system of claim 1 further comprising a transparent viewing panel mounted in said water discharge conduits.

3. The propulsion system of claim 1 further comprising an access hatch mounted to one of said discharge conduits adjacent one of said impellers.

4. The propulsion system of claim 3 further comprising a conduit extension having a first end in communication with a said discharge conduit adjacent an impeller and wherein said conduit extension has an opposing end extending above the waterline of the vessel, and wherein said access hatch is mounted on said conduit extension.

5. The propulsion system of claim 1 further comprising a plurality of valves to selectively seal said water intake openings and said water discharge openings.

6. The propulsion system of claim 5 wherein said valves are selectively operable to limit the amount of water flow through said propulsion system.

7. The propulsion system of claim 1, further comprising a plurality of straightening vanes mounted within each of said discharge conduits.

8. A propulsion system mounted in a hull of a marine vessel, wherein the marine vessel defines a waterline in relation to the surrounding water, comprising:
    a) at least two water intake openings defined in the hull below the waterline of the vessel;
    b) a collection chamber mounted within the hull;
    c) at least two water intake conduits extending from said water intake openings to said collection chamber;
    d) at least two water discharge openings defined in the stern of the hull;
    e) at least two water discharge conduits extending from said collection chamber to said water discharge openings;
    f) at least one impeller mounted in each of said discharge conduits;
    g) wherein said at least two water intake openings are adjacent the bow on the port and starboard portions of the hull; and,
    h) water intake cylinders mounted over said water intake openings, wherein said water intake cylinders define a plurality of smaller openings to allow water into said water intake openings while inhibiting the passage of solid objects.

9. The propulsion system of claim 8 wherein each said water intake cylinder has a cross-sectional area greater than the cross-sectional area of each said water intake conduit.

10. A propulsion system mounted in a hull of a marine vessel, wherein the marine vessel defines a waterline in relation to the surrounding water, comprising:
    a) at least two water intake openings defined in the hull below the waterline of the vessel;
    b) a collection chamber mounted within the hull;
    c) at least two water intake conduits extending from said water intake openings to said collection chamber;
    d) at least two water discharge openings defined in the stem of the hull;
    e) at least two water discharge conduits extending from said collection chamber to said water discharge openings;
    f) at least one impeller mounted in each of said discharge conduits; and,
    g) wherein the cross-sectional area of each of said discharge conduits is reduced adjacent to each said impeller.

11. A propulsion system mounted in a hull of a marine vessel, wherein the marine vessel defines a waterline in relation to the surrounding water, comprising:
    a) at least two water intake openings defined in the hull below the waterline of the vessel;
    b) a collection chamber mounted within the hull;
    c) at least two water intake conduits extending from said water intake openings to said collection chamber;
    d) at least two water discharge openings defined in the stem of the hull;
    e) at least two water discharge conduits extending from said collection chamber to said water discharge openings;
    f) at least one impeller mounted in each of said discharge conduits; and,
    g) a discharge nozzle mounted to each said discharge opening.

12. The propulsion system of claim 11 further comprising a plurality of turbulator tabs mounted to each of said discharge nozzles.

13. A propulsion system mounted in a hull of a marine vessel, wherein the marine vessel defines a waterline in relation to the surrounding water, comprising:

a) at least two water intake openings defined in the hull below the waterline of the vessel;

b) a collection chamber mounted within the hull;

c) at least two water intake conduits extending from said water intake openings to said collection chamber;

d) at least two water discharge openings defined in the stern of the hull;

e) at least two water discharge conduits extending from said collection chamber to said water discharge openings;

f) at least one impeller mounted in each of said discharge conduits; and, g) side thrusters defined in the hull adjacent a stern of the hull on port and starboard sides of the hull, wherein said side thrusters are coupled to said discharge conduits.

14. A system for allowing access to an impeller portion of a propulsion system mounted within a marine vessel wherein the vessel defines a waterline surrounding the vessel, comprising:

a) a conduit system mounted within a hull of the marine vessel below the level of the vessel's waterline and containing the impeller portion of the propulsion system;

b) a conduit extension section diverging from said conduit system with a first end in open communication with said conduit system adjacent said impeller portion and an opposing end extending above the level of the vessel's waterline; and, c) a sealable hatch operably mounted to close said opposing end of said conduit extension.

15. The access system of claim 14 further comprising a plurality of valves operable to prevent water flow into or out of said conduit system.

16. The access system of claim 15 further comprising a pump connected to said conduit system and operable to evacuate water from said conduit system.

17. The access system of claim 16 further comprising a transparent viewing panel mounted to said conduit system.

18. A method of propelling a hull of a marine vessel, comprising the steps of:

a) drawing water into a propulsion system through at least three intake openings defined in the hull below the waterline of the vessel;

b) transporting the water to a collection chamber mounted within the hull;

c) feeding water from said collection chamber into at least two impeller portions; and, d) discharging the water through openings defined in the stem of the hull.

* * * * *